United States Patent
Kim et al.

(10) Patent No.: US 7,978,180 B2
(45) Date of Patent: Jul. 12, 2011

(54) APPARATUS AND METHOD FOR PROVIDING HAPTICS OF IMAGE

(75) Inventors: Yoon-sang Kim, Yongin-si (KR); Byung-seok Soh, Suwon-si (KR); Jun-il Sohn, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 991 days.

(21) Appl. No.: 11/183,171

(22) Filed: Jul. 18, 2005

(65) Prior Publication Data
US 2006/0143342 A1   Jun. 29, 2006

(30) Foreign Application Priority Data

Dec. 28, 2004   (KR) .................. 10-2004-0113691

(51) Int. Cl.
*G06F 3/041*   (2006.01)

(52) U.S. Cl. .................. 345/173; 345/156; 340/825.19; 710/15; 710/73

(58) Field of Classification Search .................. 345/156, 345/163, 173; 340/825.19
See application file for complete search history.

(56) References Cited

U.S. PATENT DOCUMENTS

| 5,896,076 | A  | * | 4/1999  | van Namen ............... 335/229 |
| 6,184,868 | B1 | * | 2/2001  | Shahoian et al. ............ 345/161 |
| 6,429,846 | B2 | * | 8/2002  | Rosenberg et al. .......... 345/156 |
| 6,704,001 | B1 | * | 3/2004  | Schena et al. .............. 345/161 |
| 7,228,323 | B2 | * | 6/2007  | Angerer et al. ............. 708/203 |
| 7,352,356 | B2 | * | 4/2008  | Roberts et al. ............. 345/156 |
| 7,450,110 | B2 | * | 11/2008 | Shahoian et al. ........... 345/173 |
| 2002/0033795 | A1 | * | 3/2002  | Shahoian et al. ........... 345/156 |
| 2003/0038776 | A1 | * | 2/2003  | Rosenberg et al. .......... 345/156 |
| 2004/0075676 | A1 | * | 4/2004  | Rosenberg et al. .......... 345/701 |
| 2004/0135468 | A1 | * | 7/2004  | De Weerdt et al. .......... 310/311 |
| 2004/0227727 | A1 | * | 11/2004 | Schena et al. .............. 345/156 |
| 2006/0044271 | A1 | * | 3/2006  | Anastas .................... 345/163 |
| 2006/0119586 | A1 | * | 6/2006  | Grant et al. ................ 345/173 |

FOREIGN PATENT DOCUMENTS

JP   2003-330688   11/2003
KR   2002-0011328   2/2002

* cited by examiner

*Primary Examiner* — Alexander Eisen
*Assistant Examiner* — Viet Pham
(74) *Attorney, Agent, or Firm* — Staas & Halsey LLP

(57) ABSTRACT

An apparatus for and method of providing haptics of an image displayed through an image unit. The apparatus includes: a touch unit checking whether a user has touched a portion of the displayed image, and searching for a position of the portion when the user touches the portion; and a magnetic force changing unit changing magnetic forces in response to haptic information corresponding to the position and expressing the changed magnetic forces through the image unit. The haptics of the portion are provided through the change of the expressed magnetic forces.

36 Claims, 14 Drawing Sheets

(a)

(b)

APPARATUS AND METHOD FOR PROVIDING HAPTICS OF IMAGE

CROSS-REFERENCE TO RELATED APPLICATION

This application claims the priority of Korean Patent Application No. 2004-0113691, filed on Dec. 28, 2004, in the Korean Intellectual Property Office, the disclosure of which is incorporated herein by reference.

BACKGROUND OF THE INVENTION

1. Field of the Invention

The present invention relates to a method of processing an image, and more particularly, to an apparatus and method for providing haptics of a displayed image to a user.

2. Description of Related Art

A conventional method of providing haptics of an image is disclosed in Korean Patent Application No. 2002-11328. To provide haptics of an image, the conventional method disadvantageously requires a mechanical interface device (e.g., a belt, a pulley, and a cable) and an actuator (e.g., an electrical motor) for driving the interface device.

Another conventional method of providing haptics of an image is disclosed in Japanese Patent Application No. 2003-330688. The conventional method can indirectly provide haptics of a displayed image to a user through a separate mouse that has a special configuration. Accordingly, such conventional methods cannot directly provide haptics of an image to a user.

Further, the conventional methods provide haptics of only a single point of an image at a certain time. When users want to feel haptics of a point (referred to as a request point) far away from a reference point, the conventional methods need to perform many calculations to move from the reference point to the request point, thereby making it impossible to feel haptics of the request point. Also, the conventional methods cannot provide haptics to users in real time.

BRIEF SUMMARY

An aspect of the present invention provides an apparatus for directly providing haptics of an image, which is displayed on an image unit, to a user through the image unit.

An aspect of the present invention also provides a method of directly providing haptics of an image, which is displayed on an image unit, to a user through the image unit.

According to an aspect of the present invention, there is provided an apparatus for providing haptics of an image displayed through an image unit, the apparatus including: a touch unit checking whether a user has touched a portion of the displayed image, and searching for a position of the portion when the user touches the portion; and a magnetic force changing unit changing magnetic forces in response to haptic information corresponding to the position and expressing the changed magnetic forces through the image unit. Haptics of the portion are provided through the change of the expressed magnetic forces.

According to another aspect of the present invention, there is provided a method of providing haptics of an image displayed through an image unit, the method including: checking whether a user touches a desired portion of an image displayed in the image unit, and searching for a position of the portion; and changing magnetic forces according to haptic information corresponding to the searched position and expressing the changed magnetic forces through the image unit. Haptics of the portion are provided to the user through the change of the expressed magnetic forces.

According to another aspect of the present invention, there is provided an image haptics providing apparatus, including: a touch unit determining whether a user has touched a portion of a displayed image displayed on an image unit and determining a position of the touched portion; and a magnetic force changing unit selecting haptic information corresponding to the determined position among input haptic information and communicating magnetic forces changed in response to the selected haptic information through the image unit.

According to another aspect of the present invention, there is provided an image unit, including: a display module displaying an image; an upper magnetic force unit above the display module and including a plurality of electromagnetic cells changing magnetic forces in response to an upper magnetic force control signal; a lower magnetic force unit under the upper magnetic force unit and including a plurality of electromagnetic cells changing magnetic forces in response to a lower magnetic force control signal; a touch unit determining whether a user has touched a portion of a displayed image and searching for a position of the touched portion; and a magnetic force changing unit selecting haptic information corresponding to the position and generating the upper and lower magnetic force control signals using analyzed results to communicate the haptic information.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
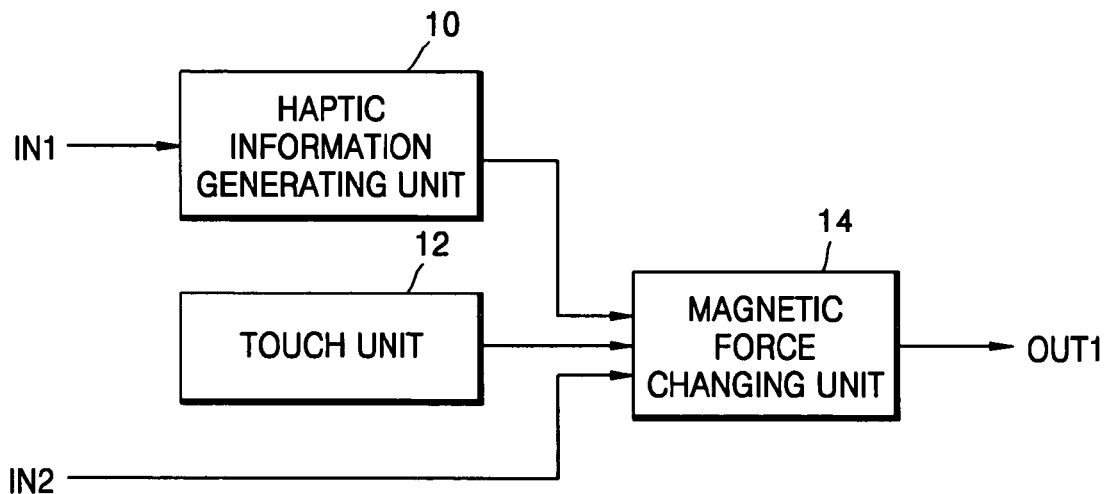
FIG. 1 is a block diagram of an apparatus for providing haptics of an image according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an apparatus for providing haptics of an image according to an embodiment of the present invention. The image haptics providing apparatus includes a haptic information generating unit 10, a touch unit 12, and a magnetic force changing unit 14.

Figure 2:
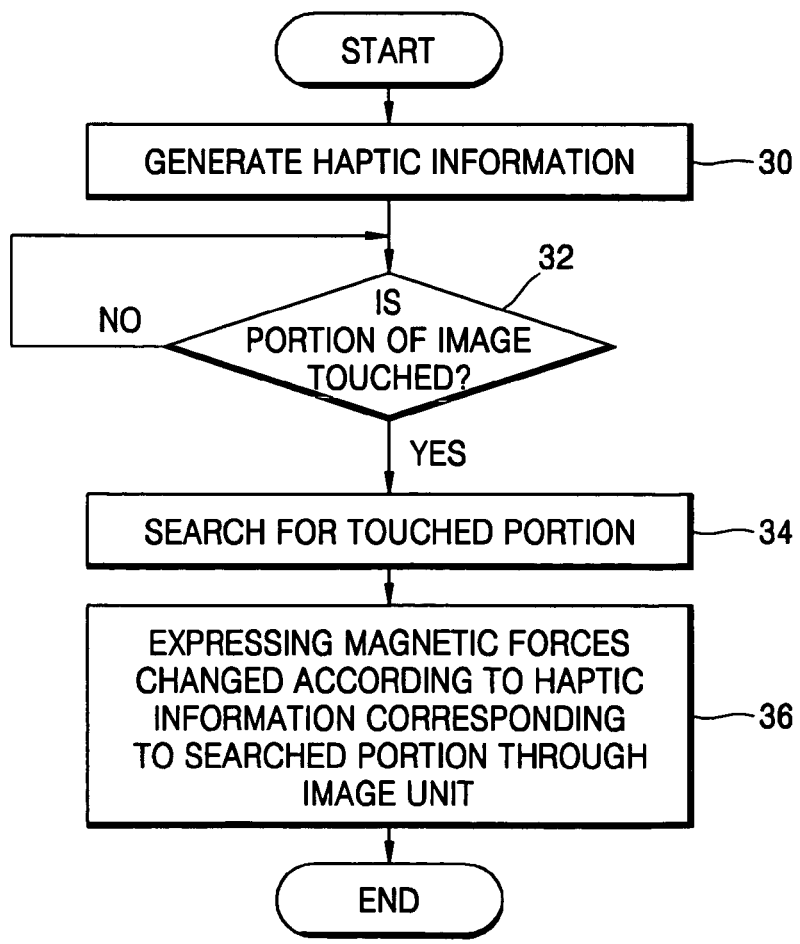
FIG. 2 is a flowchart of a method of providing haptics of an image according to an embodiment of the present invention.

FIG. 2 is a flowchart of a method of providing haptics of an image according to an embodiment of the present invention. The image haptics providing method includes generating haptic information in operation 30, searching for a position of a touched portion when it is determined that an image is touched in respective operations 34 and 32, and changing magnetic forces corresponding to haptics of the touched portion in operation 36.

The image haptics providing apparatus provides haptics of an image, which is displayed through an image unit, to a user as follows.

Referring to FIGS. 1 and 2, in operation 30, the haptic information generating unit 10 receives the image to be displayed through an input terminal IN1, generates haptic information on haptics of the input image, and outputs the generated haptic information to the magnetic force changing unit 14.

Figure 3:
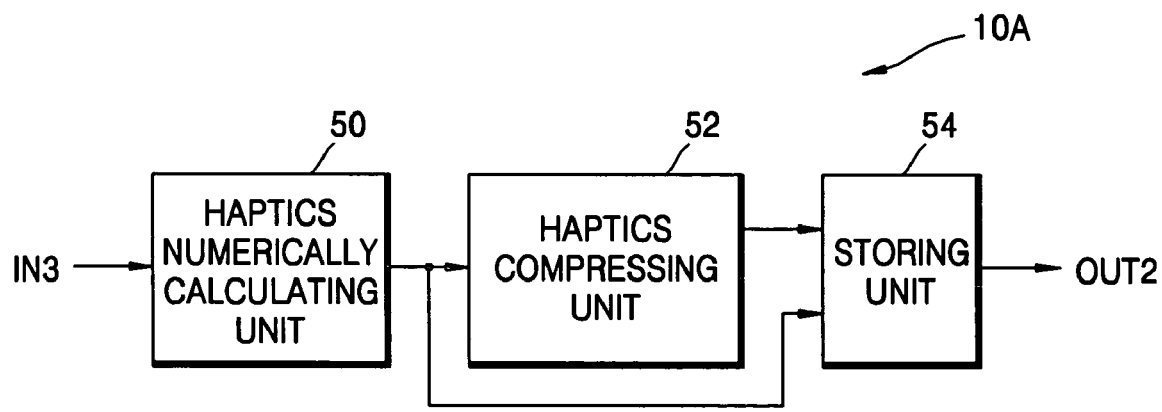
FIG. 3 is a block diagram of a haptic information generating unit shown in FIG. 1.

FIG. 3 is a block diagram of an example 10A of the haptic information generating unit 10 shown in FIG. 1 according to an embodiment of the present invention. The haptic information generating unit 10A includes a haptics numerically calculating unit 50, a haptics compressing unit 52, and a storing unit 54.

Figure 4:
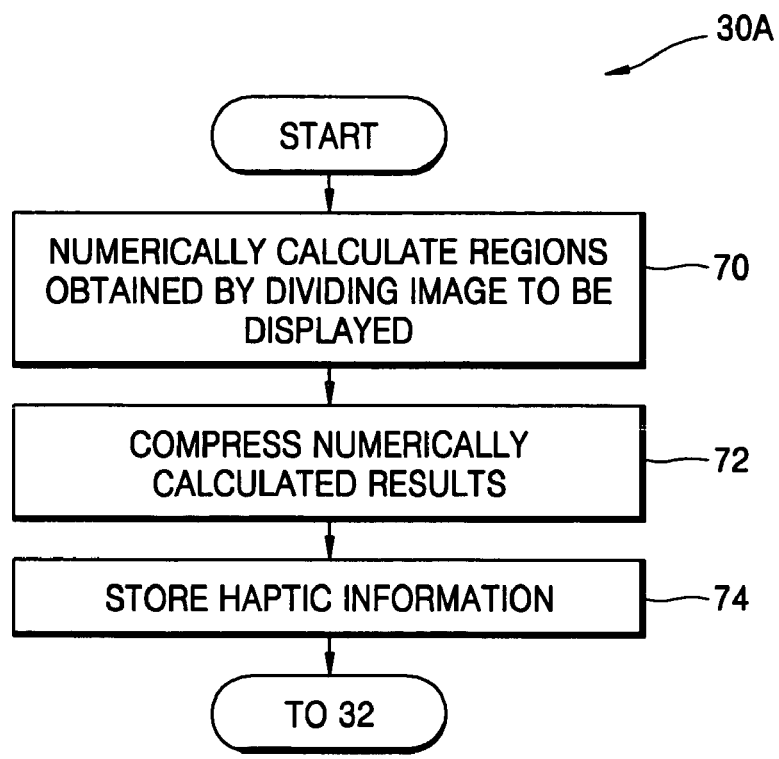
FIG. 4 is a flowchart of an operation of generating haptic information shown in FIG. 2.

FIG. 4 is a flowchart of an example 30A of operation 30 shown in FIG. 2 according to the present embodiment. Operation 30A includes numerically calculating regions obtained by dividing the displayed image, compressing the numerically calculated regions, and storing the compressed regions in respective operations 70, 72, and 74.

Referring to FIGS. 3 and 4, in operation 70, the haptics numerically calculating unit 50 shown in FIG. 3 receives an image to be displayed on the image unit through an input terminal IN3, divides the input image into a plurality of regions, and numerically calculates haptics of each region. Here, each region obtained by dividing the image to be displayed contains a designated number of pixels or voxels.

According to the present embodiment, the designated number is determined depending on at least one of a resolution of haptics to be provided to the user and a size of a portion to be touched. For example, the greater the resolution, the smaller the designated number is set. That is, to provide more precise haptics to the user, the designated number should be set to a small number.

In general, an image to be displayed may have various kinds of haptics. For example, the image may nave as a haptics at least one of force feedback, tactile feedback, temperature feedback, and vibration feedback. Here, the force feedback includes rigidity or hardness, softness or deformability, repulsiveness, and attractiveness. The tactile feedback includes softness, roughness, coarseness, and slipperiness, smoothness, or slickness. The temperature feedback includes coldness, coolness or chillness, and warmth. The vibration feedback includes vibration. In this regard, the regions obtained by dividing the image to be displayed may have various haptics. Accordingly, in operation 70, the image is divided into a plurality of regions and haptics of each region can be numerically calculated, for example, as a digital value. When it is assumed that each region is represented using one of the aforesaid 15 haptics, the haptics numerically calculating unit 50 can numerically calculate the haptics of each region as a 4-bit digital value. For example, the force feedback may be set to 0000, the tactile feedback to 0001, the temperature feedback to 0010, the vibration feedback to 0011, the rigidity to 0100, the deformability to 0101, the repulsiveness to 0110, the attractiveness to 0111, the softness to 1000, the roughness to 1001, the coarseness to 1010, the slipperiness to 1011, the coldness to 1100, the warmth to 1101, and the vibration to 1110, and then haptics of each region may be represented as one of the 15 digital values.

In operation 72, the haptics compressing unit 52 compresses duplicated parts in numerically calculated results obtained by the haptics numerically calculating unit 50, and outputs compressed results to the storing unit 54. For example, regions having the same haptics in the image may be combined and compressed into one region, and then numerically calculated results about the combined region may be output to the storing unit 54.

In operation 74, the storing unit 54 stores the compressed results obtained by the haptics compressing unit 52, and outputs the stored results as haptic information to the magnetic force changing unit 14 through an output terminal OUT2.

Alternatively, unlike in FIG. 3, the haptic information generating unit 10A may not include the haptics compressing unit 52. In this case, operation 30A shown in FIG. 4 does not include operation 72. Accordingly, in operation 74, the storing unit 54 stores numerically calculated results of each region obtained by the haptics numerically calculated unit 50 as haptic information, and outputs the stored haptic information through the output terminal OUT2 to the magnetic force changing unit 14.

Alternatively, unlike in FIG. 1, the image haptics providing apparatus may not include the haptic information generating unit 10. In this case, the image haptics providing method shown in FIG. 2 does not include operation 30. Accordingly, after haptic information is generated outside the haptic information providing apparatus shown in FIG. 1, the haptic information is input to the magnetic changing unit 14 through an input terminal IN2. If haptic information is externally generated and then input to the image haptics providing apparatus in this way, the image haptics providing apparatus shown in FIG. 1 may be embedded in the image unit and realized as a micro-electro-mechanical system or a nano-electro-mechanical system.

Referring to FIGS. 1 and 2, in operation 32, it is judged whether the user has touched a desired portion of image displayed on the image unit of which the user wants to feel the haptics. If the user touches the portion, in operation 34, the touch unit 12 shown in FIG. 1 searches for (i.e., determines) a position of the touched portion. Here, the user may touch the portion using a body part or a touch member (not shown). Accordingly, the user can touch the desired portion of image displayed on the image unit using the touch member.

It is assumed that the aforesaid designated number is determined depending on a size of a portion to be touched. Here, if the user touches the desired portion using a body part (e.g., fingertip), the designated number is greater than the designated number set when the user touches the portion using the touch member having a stylus tip (e.g., pen tip or tool tip). This is because when the portion of the image unit touched by the fingertip has a plurality of pixels or voxels while the portion of the image unit touched by the stylus tip has an extremely small number of pixels or voxels.

Figure 5:
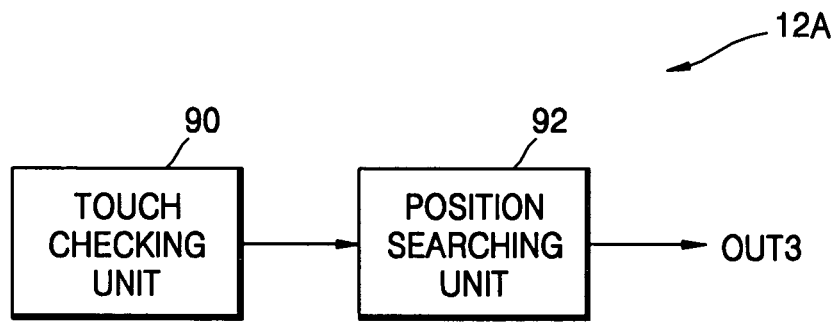
FIG. 5 is a block diagram of a touch unit shown in FIG. 1.

FIG. 5 is a block diagram of an example 12A of the touch unit 12 shown in FIG. 1 according to an embodiment of the present invention. The touch unit 12A includes a touch checking unit 90 and a position searching unit 92.

Referring to FIGS. 1, 2 and 5, in operation 32, the touch checking unit 90 checks when the portion, of which the user wants to feel haptics, in the image displayed on the image unit is touched and outputs checked results to the position searching unit 92. If it is recognized through the checked results from the touch checking unit 90 that the desired portion, of which the user wants to feel haptics, is touched, in operation 34, the position searching unit 92 searches for a position of the touched portion, and outputs the searched position to the magnetic force changing unit 14 through an output terminal OUT3.

In operation 36, the magnetic force changing unit 14 selects haptic information corresponding to the position searched by the touch unit 12 among haptic information input from the haptic information generating unit 10 or through the input terminal IN2, and expresses magnetic forces changed in response to the selected haptic information through the image unit through the output terminal OUT1. At this time, the user can feel haptics of the touched portion through the change of the magnetic forces output from the magnetic force changing unit 14. For example, if the touch member is touched on the image unit, the user can feel the change of the magnetic forces through the touch member as a haptics, and if his or her body part is touched on the image unit, the user can feel the change of the magnetic forces through the body part.

Figure 6:
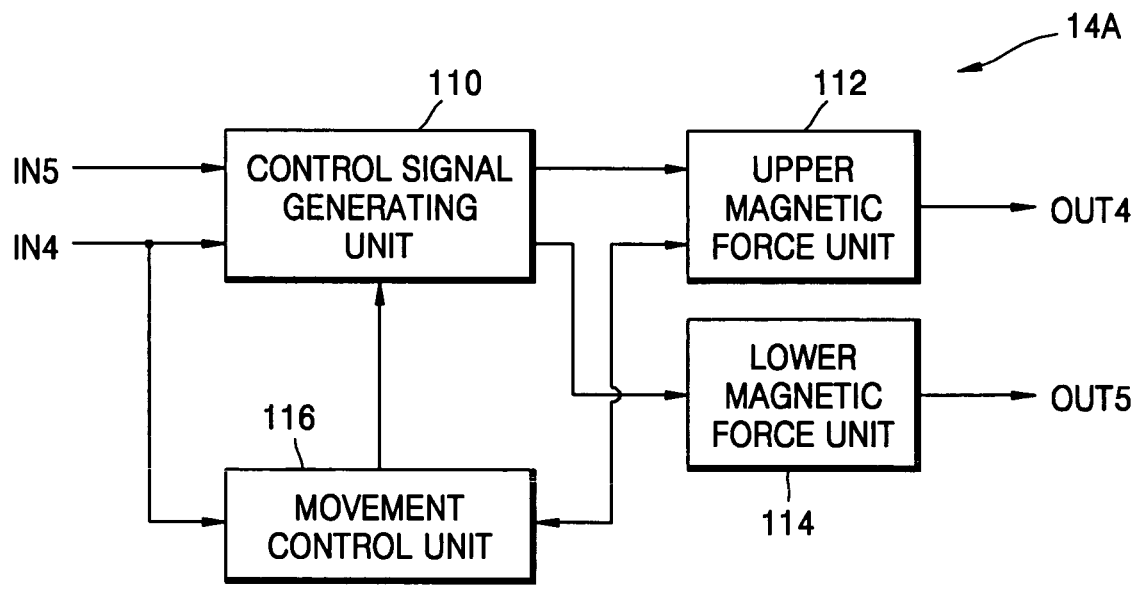
FIG. 6 is a block diagram of a magnetic force changing unit shown in FIG. 1.

FIG. 6 is a block diagram of an example 14A of the magnetic force changing unit 14 shown in FIG. 1 according to the present embodiment. The magnetic force changing unit 14A includes a control signal generating unit 110, upper and lower magnetic force units 112 and 114, and a movement control unit 116.

Referring to FIGS. 1 and 6, the control signal generating unit 110 illustrated in FIG. 6 searches for haptic information corresponding to the position input through an input terminal IN4 from the touch unit 12 in haptic information input through an input terminal IN5, analyzes the searched haptic information, generates upper and lower magnetic force control signals using analyzed results, outputs the generated upper magnetic force control signal to the upper magnetic force unit 112, and outputs the lower magnetic force control signal to the lower magnetic force unit 114.

The upper magnetic force unit 112 shown in FIG. 6 is embedded in the image unit and includes at least one electromagnetic cell. Here, the electromagnetic cell of the upper magnetic force unit 112 changes its magnetic forces in response to the upper magnetic force control signal input from the control signal generating unit 110, and outputs the changed magnetic forces through an output terminal OUT4. In a similar manner, the lower magnetic force unit 114 is embedded in the image unit to be located under the upper magnetic force unit 112, and includes a plurality of electromagnetic cells. Here, the plurality of electromagnetic cells of the lower magnetic force unit 114 change magnetic forces in response to the lower magnetic force control signals input from the control signal generating unit 110, and output the changed magnetic forces through an output terminal OUT5. Each of the electromagnetic cells constituting the upper magnetic force unit 112 and the lower magnetic force unit 114 may be realized as at least one electromagnet. The shape and operation of the electromagnet will be explained later in detail.

For example, when the image unit has a touch panel and a display module, the image unit and the upper and lower magnetic force units 112 and 114 can be arranged in various shapes. Here, the touch panel functions as the touch unit 12 shown in FIG. 1, and the display module is a panel on which an image is displayed.

Figure 7:
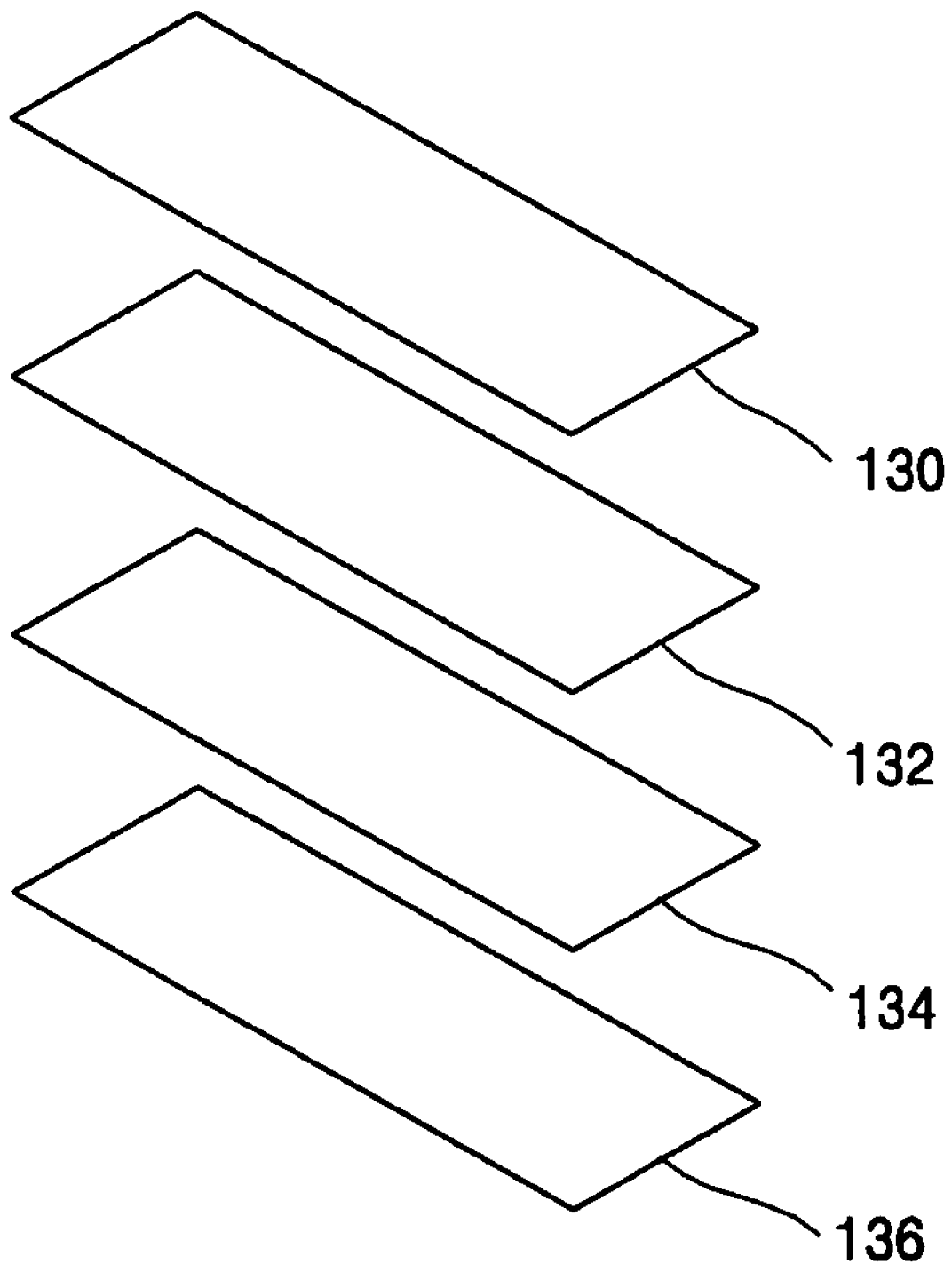
FIG. 7 is a diagram for explaining a shape where an image unit and upper and lower magnetic force units shown in FIG. 6 are arranged.

FIG. 7 is a diagram for explaining a shape where the image unit and the upper and lower magnetic force units 112 and 114 shown in FIG. 6 are arranged.

Alternatively, a lower magnetic force unit 132 may be located under an upper magnetic force unit 130, and a touch panel 134 and a display module 136 may be located under the lower magnetic force unit 132.

Alternatively, a lower magnetic force unit 136 may be located under an upper magnetic force unit 134, and a touch panel 130 and a display module 132 may be located over the upper magnetic force unit 134.

Alternatively, a touch panel 132 and a display module 134 may be disposed between an upper magnetic force unit 130 and a lower magnetic force unit 136.

As described above, when the upper magnetic force unit 130 is located over the lower magnetic force unit 136 is satisfied, the image unit and the upper and lower magnetic forces 112 and 114 can be arranged in various shapes.

The shape and operation of electromagnets included in the upper magnetic force unit 112 and the lower magnetic force unit 114 shown in FIG. 6 will be explained herein below with reference to FIG. 8.

Figure 8:
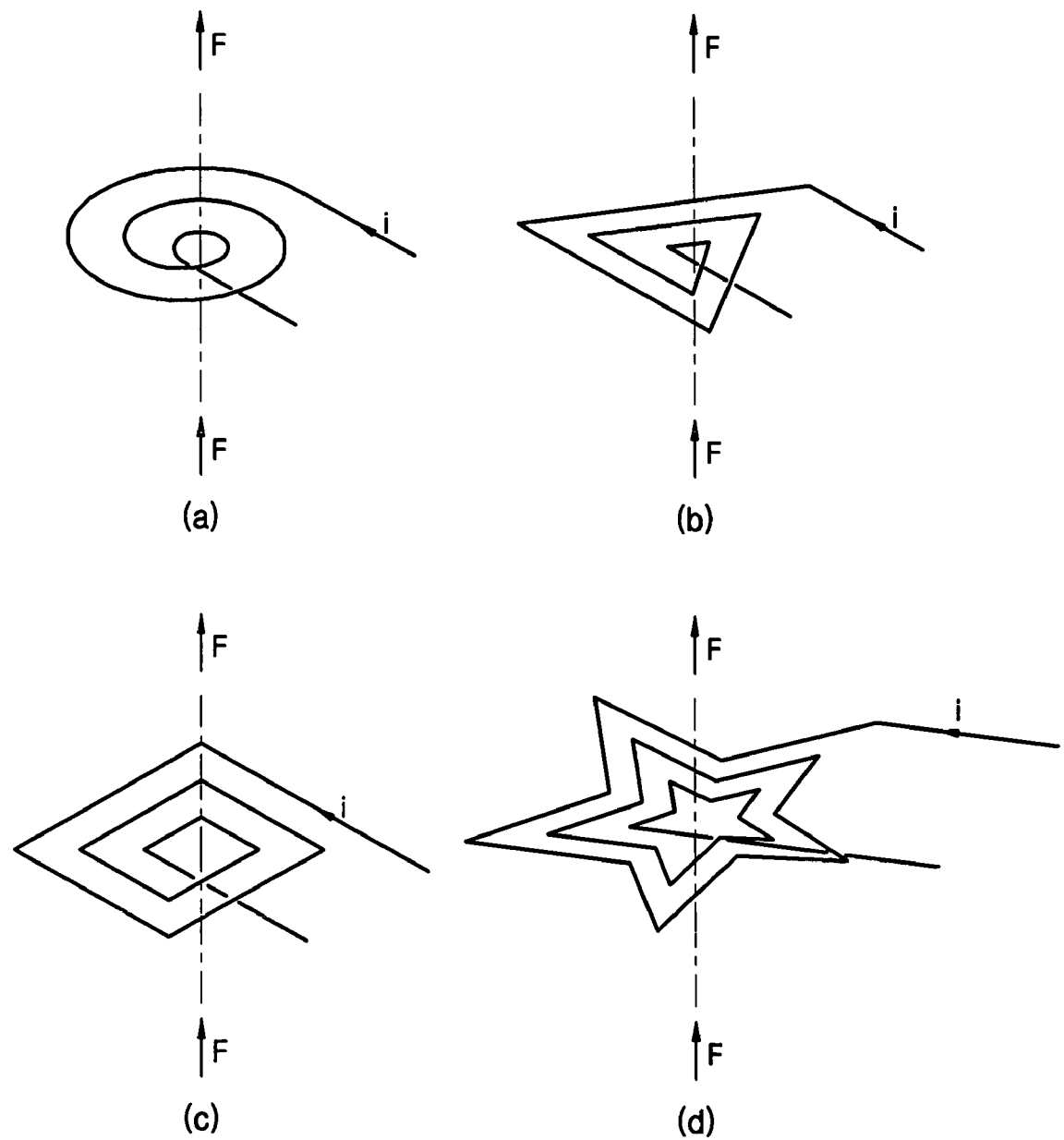
FIG. 8, parts (a)-(d), are diagrams illustrating shapes of electromagnets.

Parts (a)-(d) of FIG. 8 are diagrams illustrating shapes of electromagnets.

Each of electromagnets of the upper magnetic force unit 112 and the lower magnetic force unit 114 may be a circular coil as depicted in FIG. 8(a), a triangular coil as depicted in FIG. 8(b), a rectangular coil as depicted in FIG. 8(c), or a star-shaped coil as depicted in FIG. 8(d). Irrespective of the shape of the electromagnet, if current i is supplied in a direction shown in FIG. 8, a magnetic force F (or a magnetic field) is formed in a direction marked by arrow in each of parts (a)-(d) of FIG. 8. However, if current i is supplied in a direction opposite to the direction shown in each of parts (a)-(d) of FIG. 8, a magnetic force is formed in a direction opposite to the direction marked by the arrow in each of parts (a)-(d) of FIG. 8.

Referring to FIGS. 6 and 8, the control signal generating unit 110 can control each of the electromagnets by generating each of the upper and lower magnetic force control signals as at least one of a size of current, a direction of current, and a supply cycle of current. For example, the greater the size of current, the greater the magnetic force of the electromagnet. A strength of the magnetic force generated by each electromagnet is determined by adjusting at least one of a thickness of wires and a number of wires. That is, the greater the thickness of wires, the greater the magnetic force, and the more number of wires, the greater the magnetic force.

Figure 9:
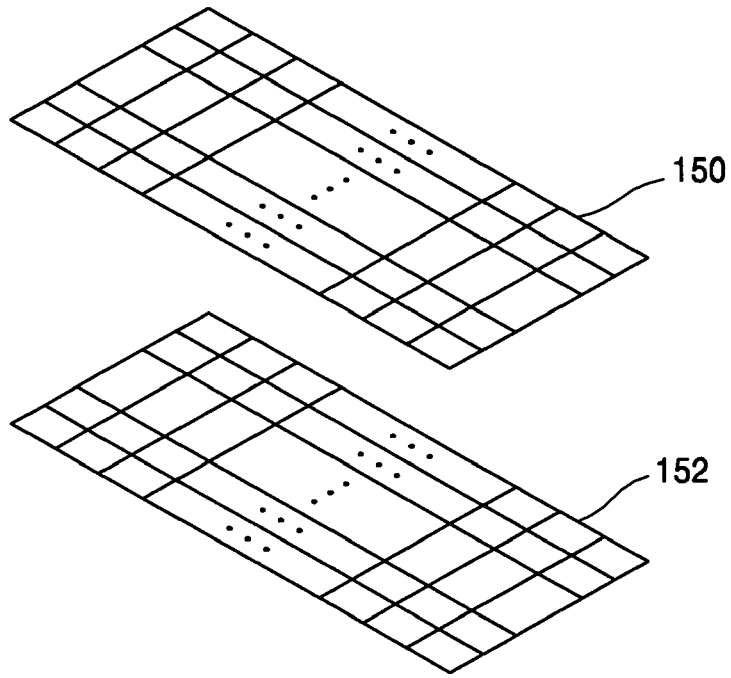
FIG. 9 is a diagram of an example of an upper magnetic force unit shown in FIG. 6.

FIG. 9 is a diagram illustrating an example of the upper magnetic force unit 112 shown in FIG. 6 according to an embodiment of the present invention. Here, one quadrangle made by a solid line represents one electromagnetic cell.

According to the present embodiment, each of an upper magnetic force unit 150 and a lower magnetic force unit 152 may include a plurality of electromagnetic cells as shown in FIG. 9. At this time, the number of electromagnetic cells included in the upper magnetic force unit 150 is equal to the number of electromagnetic cells included in the lower magnetic force unit 152.

Figure 10:
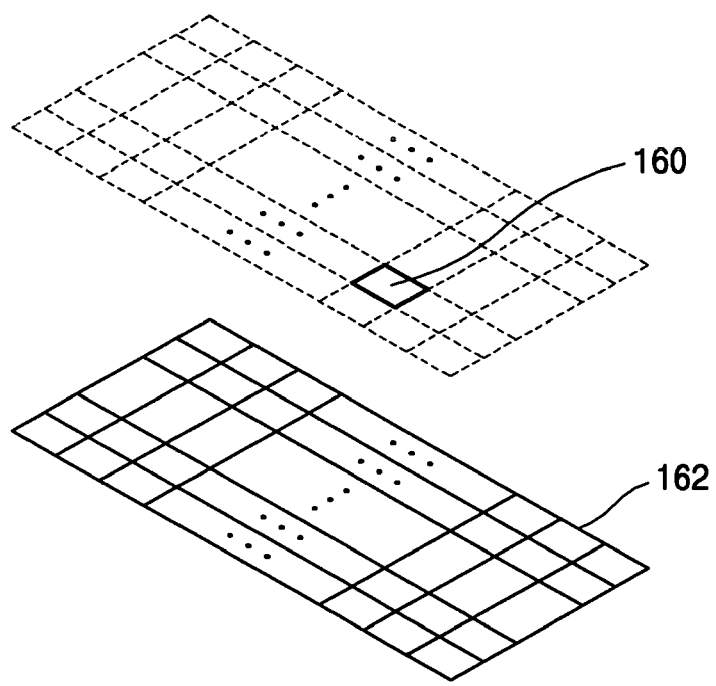
FIG. 10 is a diagram of another example of the upper magnetic force unit shown in FIG. 6.

FIG. 10 is a diagram illustrating another example of the upper magnetic force unit 112 shown in FIG. 6 according to an embodiment of the present invention. Here, one quadrangle made by a solid line represents one electromagnetic cell.

According to the present embodiment, while a lower magnetic force unit 162 may include a plurality of electromagnetic cells, an upper magnetic force unit 160 may include a few or one electromagnetic cell as shown in FIG. 10. That is, in the embodiment shown in FIG. 10, the number of electromagnetic cells included in the upper magnetic force unit 160 is less than the number of electromagnetic cells included in the lower magnetic force unit 162. At this time, the upper magnetic force unit 160 is movable.

The size of the upper magnetic force unit 160 shown in FIG. 10 will be explained.

For example, if the user touches the image unit using his or her body part (e.g., fingertip), since a portion touched on the image portion contains a plurality of pixels or voxels, haptics of the touched portion should be represented through the change of magnetic forces of a plurality of electromagnets. In this case, the upper magnetic force unit 160 shown in FIG. 10 includes a plurality of electromagnets.

However, if the user touches the image unit using the touch member having a stylus sharp tip (e.g., pen tip or tool tip), since a portion touched on the image unit contains an extremely small number of pixels or voxels, haptics of the touched portion can be represented through the change of a magnetic force of one electromagnet. In this case, the upper magnetic force unit 160 shown in FIG. 10 may include one electromagnet.

If the upper magnetic force unit 112 shown in FIG. 6 is movable as shown in FIG. 10, the magnetic force changing unit 14A shown in FIG. 6 may further include the movement control unit 116.

For example, if the display module 132 or 134 of FIG. 7 is disposed between the upper magnetic force unit 130 and the lower magnetic force unit 136 and the upper magnetic force unit 112 shown in FIG. 6 is realized as shown in FIG. 9, the change of magnetic forces of the upper magnetic force unit 130 and the lower magnetic force unit 136 will be explained herein below with reference to FIGS. 11 and 12.

Figure 11:
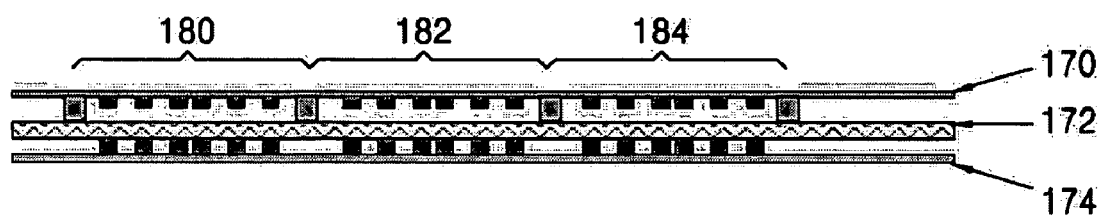
FIG. 11 is a cross-sectional view of an image unit according to an embodiment of the present invention.

FIG. 11 is a cross-sectional view of the image unit according to an embodiment of the present invention. The image unit includes an upper magnetic force unit 170, a display module 172, and a lower magnetic force unit 174.

The upper magnetic force unit 170 illustrated in FIG. 11 includes a plurality of electromagnetic cells 180, 182, and 184. Dark protrusions in each of the electromagnetic cells 180, 182, and 184 denote wires of coils.

Figure 12:
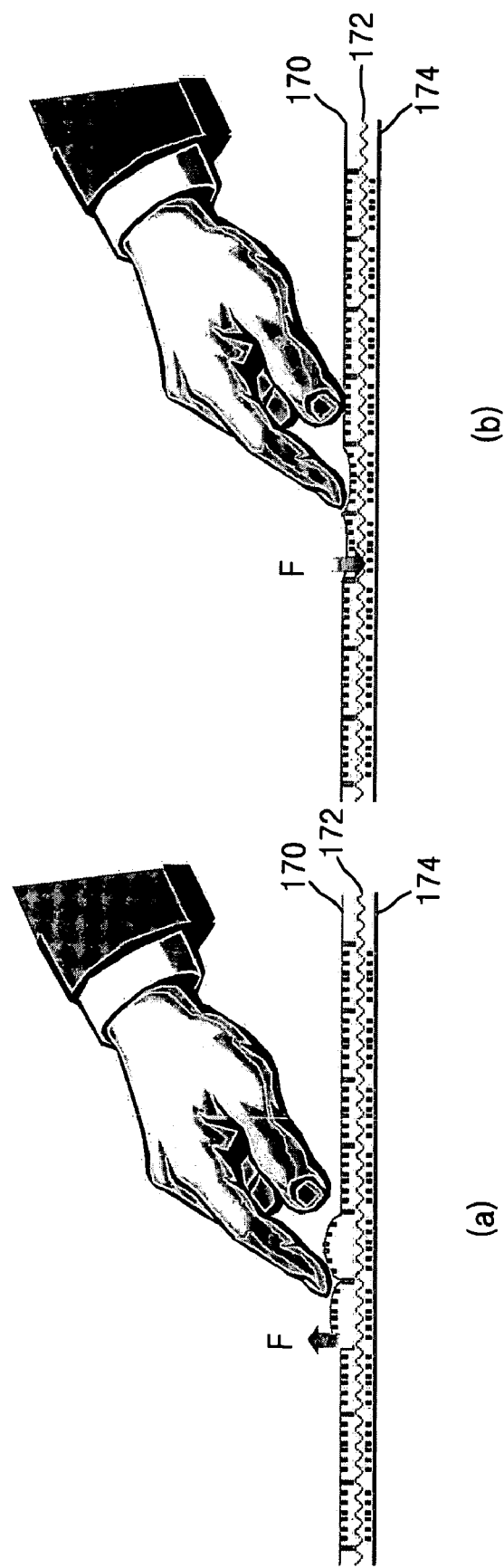
FIG. 12, parts (a) and (b), are diagrams illustrating changes of magnetic forces.

Parts (a) and (b) of FIG. 12 are diagrams illustrating the change of a magnetic force F.

It is assumed that the image unit is realized as shown in FIG. 11 and the user touches the image unit using his or her body part (e.g., fingertip) as shown in parts (a) and (b) of FIG. 12. At this time, the control signal generating unit 110 of FIG. 6 may control the upper and lower magnetic force units 112 and 114 so that the upper magnetic force unit 170 can generate a repulsive force F as shown in part (a) of FIG. 12 or the upper magnetic force unit 170 can generate an attractive force F as shown in part (b) of FIG. 12.

Figure 13:
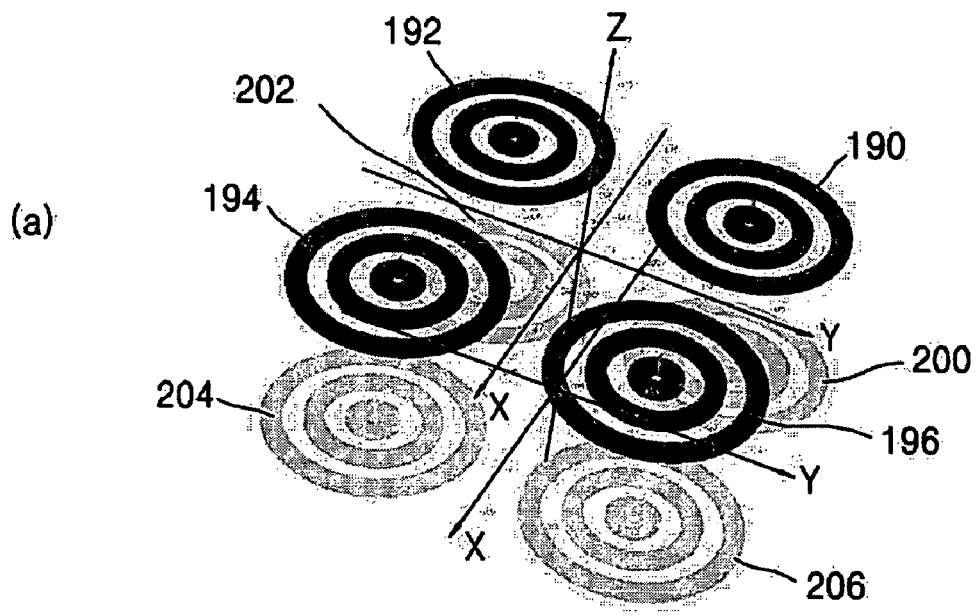
FIG. 13, parts (a) and (b), are diagrams illustrating electromagnets included in an upper magnetic force unit and electromagnets included in a lower magnetic force unit when the electromagnets are circular coils.
Figure 13:
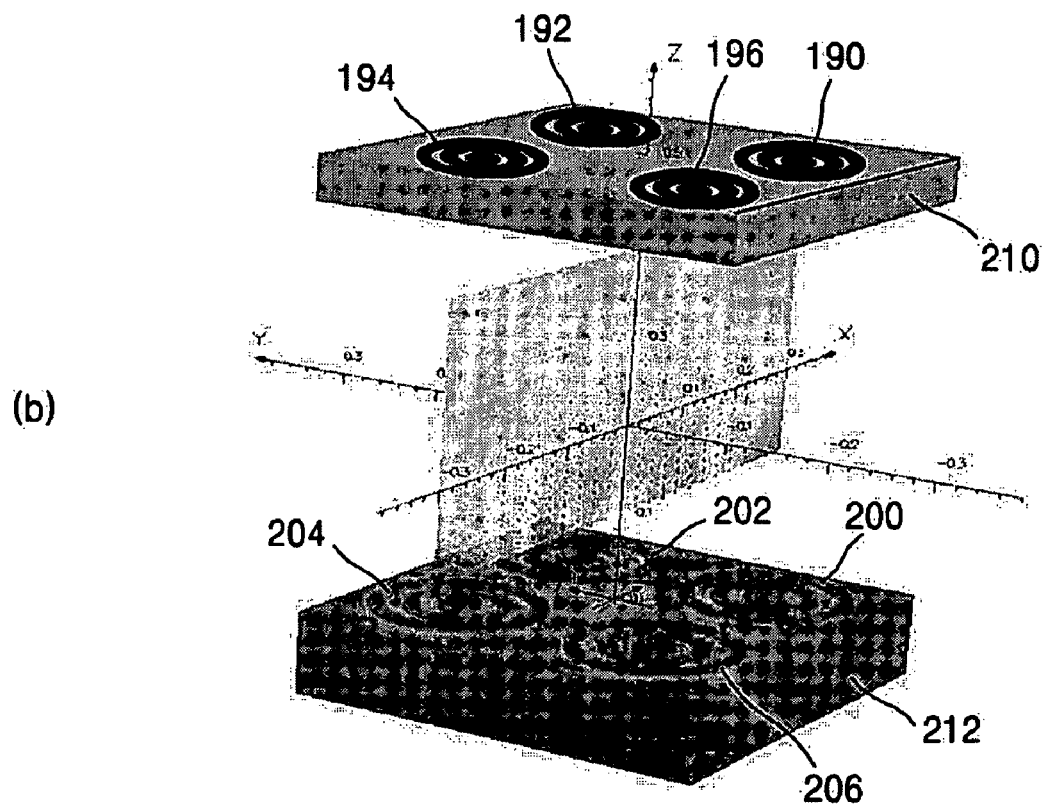

If electromagnets are circular coils, as shown in parts (a) and (b) of FIG. 13, four electromagnets 190, 192, 194, and 196 are included in an upper magnetic force unit 210 and four electromagnets 200, 202, 204, and 206 are included in a lower magnetic force unit 212.

The magnetic force changing unit 14A can provide concavo or convex feedback to the user by generating a repulsive force or an attractive force according to electromagnets as shown in parts (a) and (b) of FIG. 12. That is, if the repulse force provides convex feedback to the user and the attractive force provides concave feedback to the user, the concavo-convex feedback, that is, force feedback, can be provided as haptics of the displayed image to the user.

Alternatively, since the magnetic force changing unit 14A differently controls the change of current of electromagnets for differently changing magnetic forces among electromagnets as shown in part (b) of FIG. 13, the magnetic force changing unit 14A can provide tactile feedback of an object, such as button feedback, to the user. That is, if a concavo-convex contour of a magnetic force is used a shown in part (b) of FIG. 13, tactile feedback of an object, such as button feedback, can be provided as haptics of the displayed image to the user.

As a result, an attractive force and a repulsive force in a vertical direction provide force feedback, and an attractive force and a repulsive force in a horizontal direction provide tactile feedback. Also, the attractive force and the repulsive force in the horizontal and vertical directions provide temperature feedback or vibration feedback.

Figure 14:
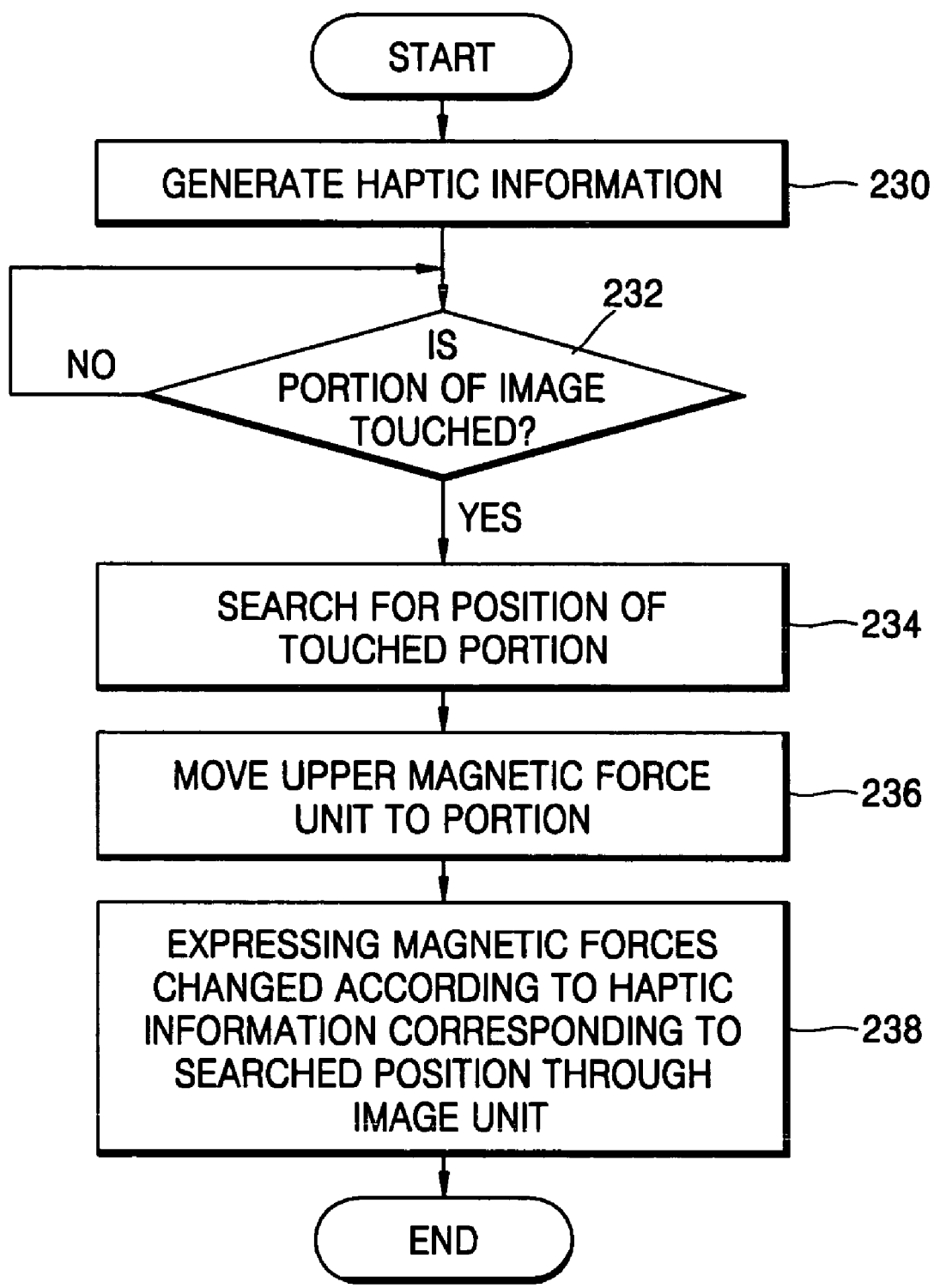
FIG. 14 is a flowchart of a method of providing haptics of an image according to another embodiment of the present invention.

FIG. 14 is a flowchart of a method of providing haptics of an image according to another embodiment of the present invention. The method includes operation 230 in which haptic information is generated, operations 232 and 234 in which when a desired portion in an image displayed on the image unit is touched, a position of the touched portion is searched for, operation 236 in which the upper magnetic force unit 112 is moved to the touched portion, and operation 238 in which a magnetic force corresponding to haptics of the touched portion is changed.

Operations 230, 232, 234, and 238 illustrated in FIG. 14 correspond to and perform the same functions and roles as operations 30, 32, 34, and 36 illustrated in FIG. 2, respectively, and thus a detailed explanation thereof is omitted.

Referring to FIGS. 6 and 14, in operation 236, the movement control unit 116 moves the upper magnetic force unit 112 from its current position to the searched position of the touched portion input through the input terminal IN4 from the touch unit 12. To this end, the movement control unit 116 generates a movement control signal and outputs the generated movement control signal to the upper magnetic force unit 112, and the upper magnetic force unit 112 is moved from its current position to the touched portion in response to the movement control signal input from the movement control unit 116. At this time, to perform operation 238 after operation 236, when the movement of the upper magnetic force unit 112 is completed, the control signal generating unit 110 generates upper and lower magnetic force control signals. To this end, the movement control unit 116 checks when the movement of the upper magnetic force unit 112 is completed, and outputs checked results to the control signal generating unit 110. If it is recognized through the checked results input from the movement control unit 116 that the movement of the upper magnetic force unit 112 is completed, the control signal generating unit 110 generates upper and lower magnetic force control signals.

Figure 15:
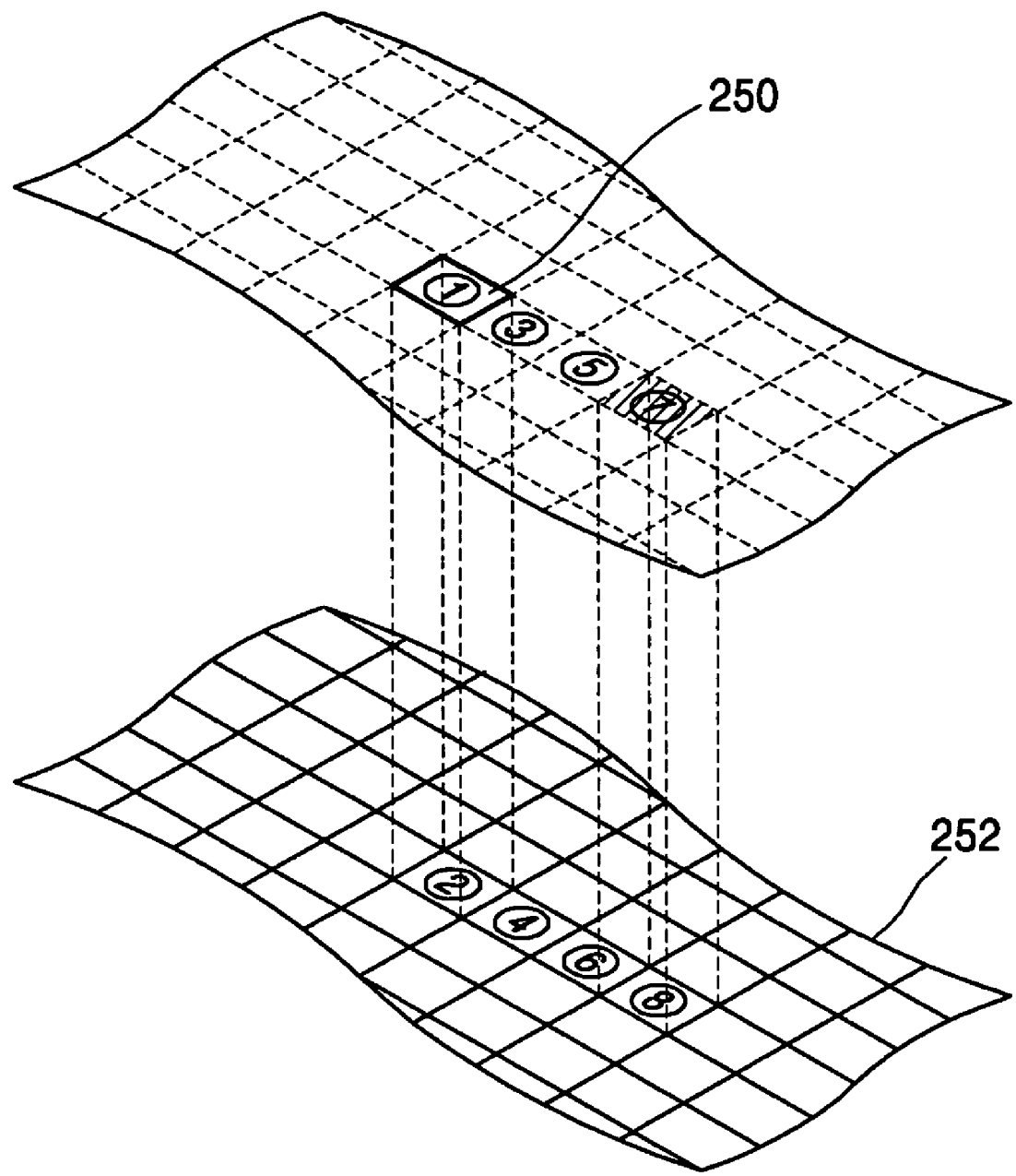
FIG. 15 is a diagram for explaining a state where the upper magnetic force unit shown in FIG. 6 is moved from its current position to a touched portion when the upper magnetic force unit is configured as shown in FIG. 10.

FIG. 15 is a diagram for explaining a state where an upper magnetic force unit 250 is moved from its current position to the touched portion when the upper magnetic force unit 112 illustrated in FIG. 6 is realized as shown in FIG. 10. Here, it is assumed that an upper magnetic force unit 250 includes one electromagnetic cell.

It is assumed that an electromagnetic cell of the upper magnetic force unit 250 is currently located at position ①. At this time, to generate an attractive force between the electromagnetic cell of the upper magnetic force unit 250 located at position ① and an electromagnetic cell of a lower magnetic force unit 252 located at position ②, the control signal generating unit 110 generates upper and lower control signals and outputs the same to the upper and lower magnetic force units 250 and 252, respectively.

If the user touches position ⑦ to feel haptics, the control signal generating unit 110 controls an attractive force and a repulsive force of electromagnetic cells of the lower magnetic force unit 252 located at positions ② and ④ so that the upper magnetic force unit 250 is moved from position ① to position ③. That is, the control signal generating unit 110 controls the upper magnetic force unit 250 and the lower magnetic force unit 252 so that a repulsive force can be generated between the electromagnetic cell located at position ② and the electromagnetic cell located at position ① and a repulsive force can be generated between the electromagnetic cell located at position ④ and the electromagnetic cell located at position ①. Accordingly, the upper magnetic force unit 250 is moved from position ① to position ③.

In this way, the control signal generating unit 110 sequentially controls electromagnetic cells of the lower magnetic force unit 252 located at positions ④, ⑥, and ⑧ so that the upper magnetic force unit 250 can be sequentially moved from position ③ through position ⑤ to position ⑦.

As a consequence, the control signal generating unit 110 can move the upper magnetic force unit 250 from position ① to position ⑦ using an attractive force and a repulsive force among electromagnetic cells.

Examples of haptics provided by the image haptics providing apparatuses and methods according to the above-described embodiments of the present invention will be explained with reference to FIGS. 16 through 18.

Figure 16:
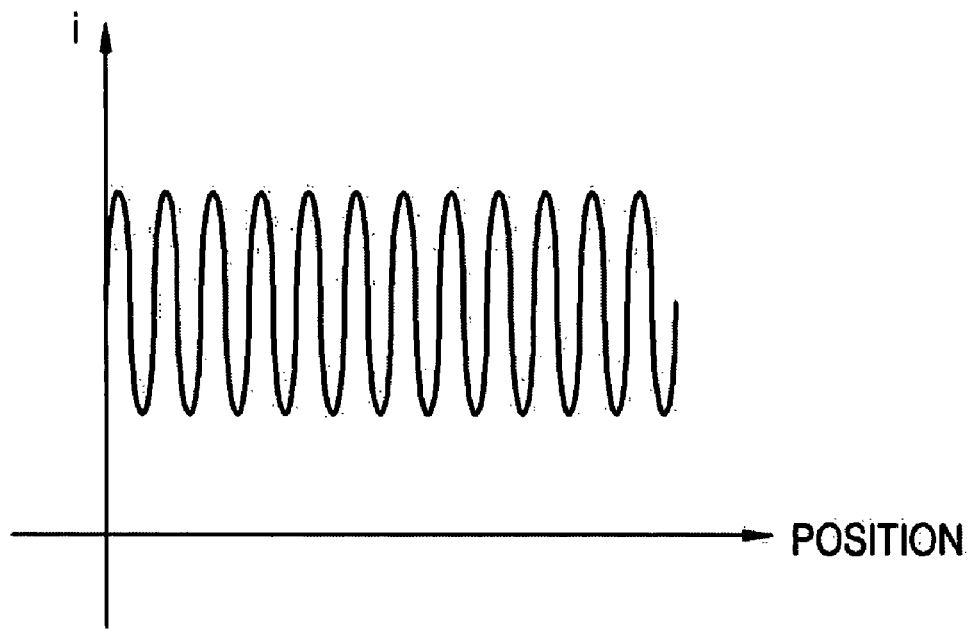
FIG. 16 is a graph illustrating a waveform of current supplied to electromagnetic cells.

FIG. 16 is a graph illustrating a waveform of current supplied to the electromagnetic cells. The vertical axis represents current i supplied to the electromagnetic cells and the horizontal axis represents spatial positions of the electromagnetic cells.

For example, to provide material feedback of a sheet of paper to the user as haptics of an image, current, which changes in a pattern of a sine waveform according to spatial positions of the electromagnetic cells as shown in FIG. 16, may be supplied as upper and lower control signals to the upper magnetic force unit 112 and the lower magnetic force unit 114. That is, when current having such a sine waveform as shown in FIG. 16 according to positions of electromagnetic cells is supplied, the user can feel haptics as if he or she actually touches a sheet of paper.

Figure 17:
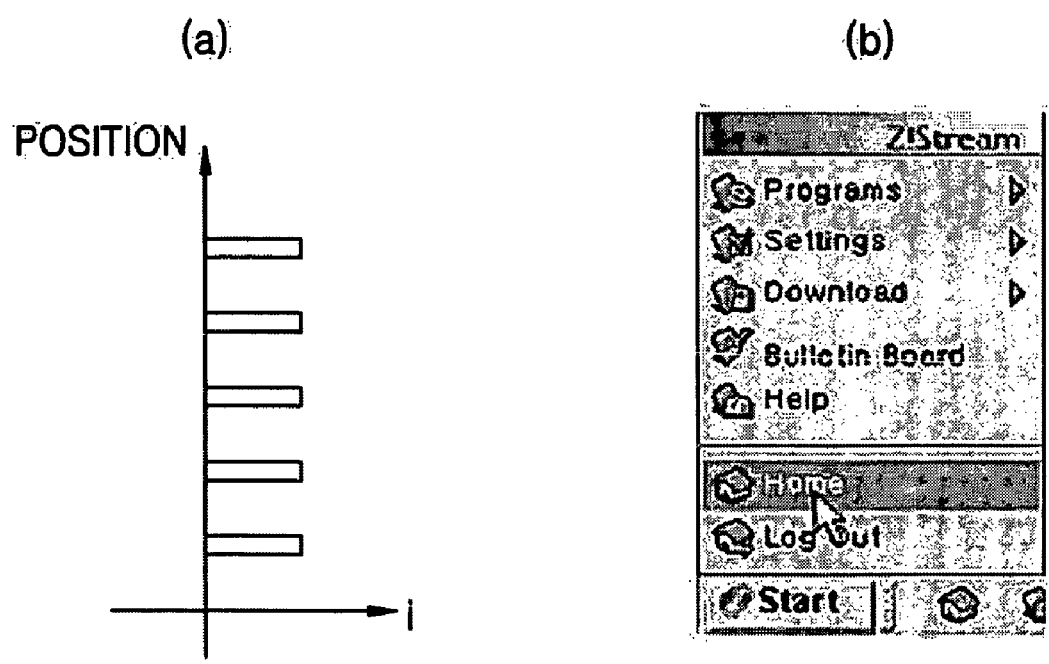
FIG. 17, parts (a) and (b), are a graph illustrating a waveform of another current supplied to the electromagnetic cells and a diagram illustrating an example of a pull-down menu, respectively.

Part (a) of FIG. 17 is a graph illustrating a waveform of another current supplied to the electromagnetic cells. The vertical axis represents spatial positions of the electromagnetic cells, and the horizontal axis represents current i supplied to the electromagnetic cells. Part (b) of FIG. 17 is a diagram illustrating an example of a pull-down menu.

For example, if such a menu as shown in part (b) of FIG. 17 is displayed on the image unit and current having a square waveform as shown in part (a) of FIG. 17 according to positions of electromagnetic cells is supplied to the coils, the user can feel slipperiness feedback between adjacent menu items and protrusion feedback from the menu items when sequentially touching the menu items shown in part (b) of FIG. 17 downward.

Figure 18:
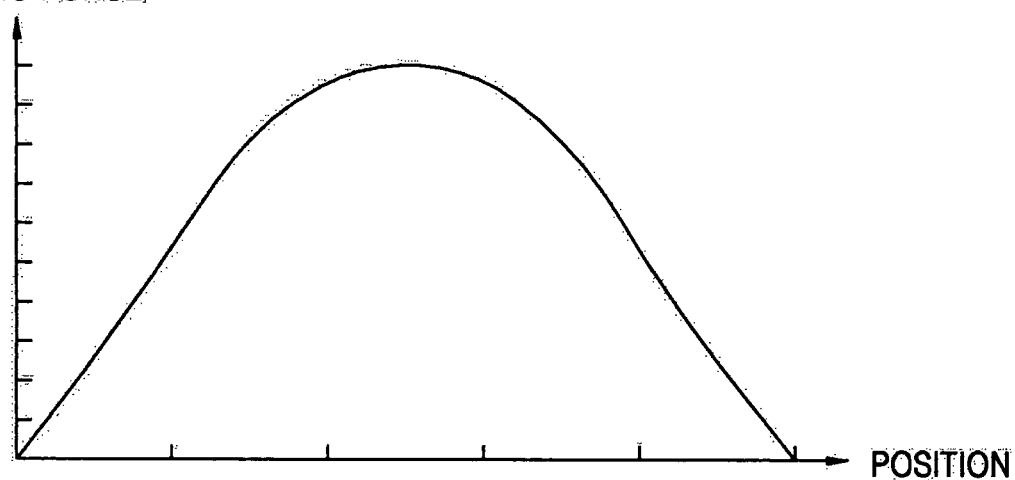
FIG. 18 is a graph illustrating a waveform of a magnetic force occurring from the electromagnetic cells.

FIG. 18 is a graph illustrating a waveform of magnetic forces caused from the electromagnetic cells. The horizontal axis represents spatial positions of the electromagnetic cells, and the vertical axis represents magnetic forces caused from the electromagnetic cells.

For example, when the electromagnetic cells generate magnetic forces according to their spatial positions as shown in FIG. 18, the user can feel concavo-convex feedback when crossing a dot or a line, or when crossing a section.

Figure 19:
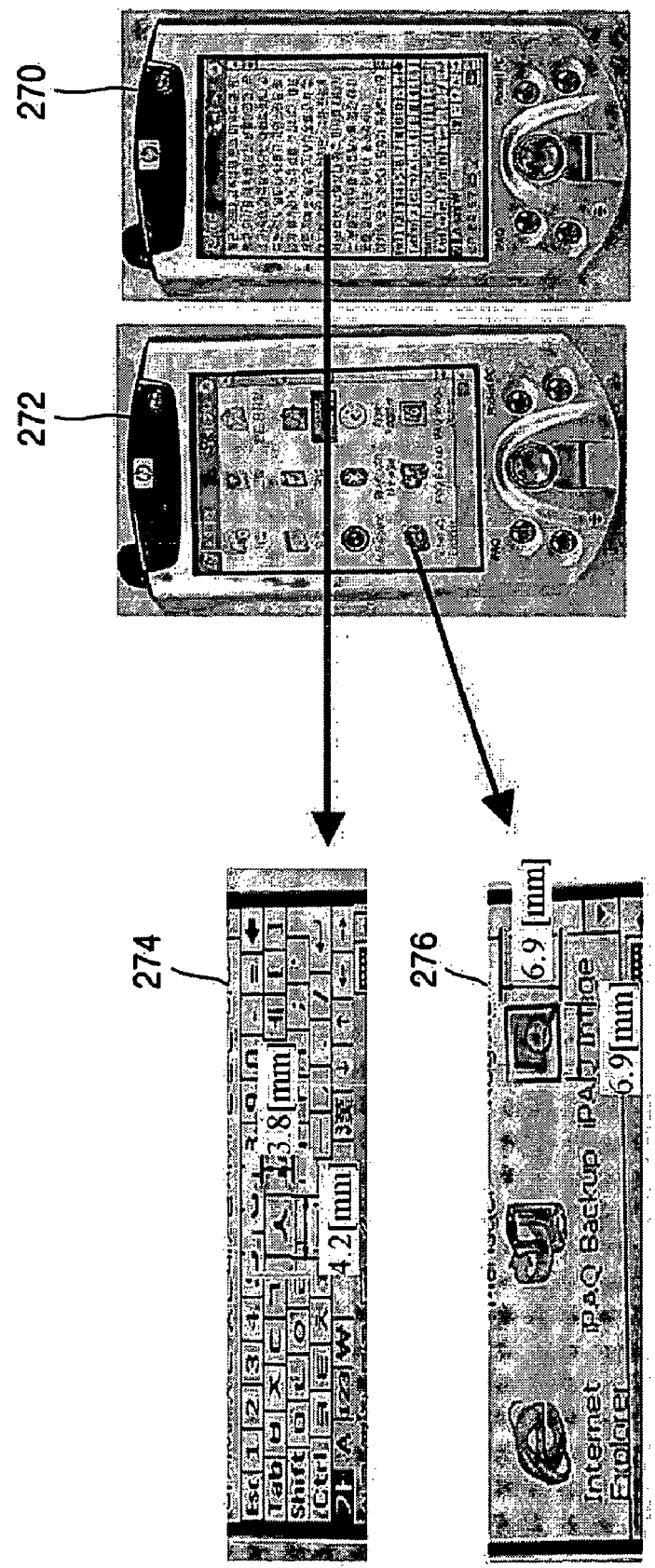
FIG. 19 is a diagram for explaining examples of used concavo-convex feedback.

FIG. 19 is a diagram for explaining examples in which concavo-convex feedback is used. The examples include images 270 and 274 used for recognizing characters, and images 272 and 276 used for recognizing icons.

The user can feel tactile feedback and recognize the kinds of characters in the displayed images 270 and 274 shown in FIG. 19 using concavo-convex feedback obtained by magnetic forces as shown in FIG. 18. To this end, the minimum horizontal size and the minimum vertical size of each consonant may be set to 4.2 mm and 3.8 mm, respectively.

In addition, the user can tell an icon from a non-icon in the displayed images 272 and 276 shown in FIG. 19 using the concavo-convex feedback obtained by the magnetic forces as shown in FIG. 18. To this end, the horizontal size and the vertical size of each icon may be set to 6.9 mm, When applied to a field where an icon is selected through a touch screen, in the above-described embodiments of the present invention, such selection causes the icon and a non-icon to provide different haptics, such that the user can more easily identify the icon. Further, when applied to a field where alphanumeric characters are selected through a touch screen, the present invention causes the alphanumeric characters to provide different haptics on a keyboard displayed through the touch screen, such that the user can more easily and exactly identify the alphanumeric characters than when the user types the characters by touching.

The above-described embodiments of image haptics providing apparatuses and methods can provide haptics to a user directly in real time through an image unit, differently from a conventional method which indirectly provides haptics of an image to a user using a mouse or the like. Also, the image haptics providing apparatuses and methods can provide the haptics of the image to the user without an interface device and an actuator. Since haptics of a menu or an icon are different from haptics of a background of the menu or the icon in a field where the menu or the icon is selected through a touch screen, the user can directly feel the haptics of the menu or the icon and can more correctly select the menu or the icon with confidence and braking power without a slip, thereby reducing errors in selection. Besides, the user can directly feel haptics of an image by touching the displayed image using his or her body part or a touch member, and can be provided with both visual and haptic effects through one image unit.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for providing haptics of an image displayed through an image unit, comprising:
    a haptics numerically calculating unit dividing the image to be displayed into a plurality of regions where each region includes a respective designated number of pixels, the respective designated number being determined in consideration of a resolution of haptics to be provided to a user and a size of a portion of the image to be touched by the user, and calculating haptic information of each region, where at least two of the plurality of regions have different sizes of haptics;
    a touch unit checking whether a user has touched a portion of the divided image, and searching for a position of the portion based on the checking; and
    a magnetic force changing unit selecting the calculated haptic information corresponding to the position searched by the touch unit, changing magnetic forces in response to the calculated haptic information corresponding to the position and expressing the changed magnetic forces through the image unit,
    wherein the magnetic force changing unit comprises:
        a lower magnetic force unit, and
        an upper magnetic force unit that includes a fewer number of electromagnetic cells than the lower magnetic force unit and the fewer number of electromagnetic cells are movable to the touched position with respect to the lower magnetic force unit to change the magnetic forces,
    wherein haptics of the portion are provided through a change of the expressed magnetic forces.

2. The apparatus of claim 1, further comprising a haptic information generating unit generating information on haptics of an image to be displayed as the haptic information.

3. The apparatus of claim 2, wherein the haptic information generating unit includes:
    the haptics numerically calculating unit; and
    a storing unit storing numerically calculated results of each region and outputting the stored results as the haptic information.

4. The apparatus of claim 3, wherein the haptic information generating unit further includes a haptics compressing unit compressing the numerically calculated results and outputting compressed results to the storing unit, and wherein the storing unit stores the compressed results and outputs the stored results as the haptic information.

5. The apparatus of claim 3, wherein each region contains a designated number of voxels instead of pixels.

6. The apparatus of claim 1, wherein the magnetic force changing unit includes:
    the upper magnetic force unit embedded in the image unit and having at least one electromagnetic cell that changes magnetic forces in response to an upper magnetic force control signal;
    the lower magnetic force unit embedded in the image unit under the upper magnetic force unit and having a plurality of electromagnetic cells that change magnetic forces in response to a lower magnetic force control signal; and
    a control signal generating unit analyzing the haptic information corresponding to the position and generating the upper and lower magnetic force control signals using analyzed results.

7. The apparatus of claim 6, wherein each of the upper and lower magnetic force control signals is a size of a current, a direction of the current, or a supply cycle of the current.

8. The apparatus of claim 6, wherein at least one electromagnet of the electromagnetic cell is one selected from the group consisting of a triangular coil, a rectangular coil, and a star-shaped coil.

9. The apparatus of claim 8, wherein a strength of the magnetic forces is determined by adjusting a thickness of wires or a number of wires included in the electromagnet.

10. The apparatus of claim 6, wherein the magnetic force changing unit includes a movement control unit moving the upper magnetic force unit from a current position to the position searched for by the touch unit, and
    wherein the control signal generating unit outputs the upper and lower magnetic force control signals when movement of the upper magnetic force unit is completed.

11. The apparatus of claim 1, wherein the user touches the image unit using a body part.

12. The apparatus of claim 1, further comprising a touch member which touches the portion of the image unit,
    wherein the user touches the image unit using the touch member, and the user feels a change of the expressed magnetic forces as haptics of the image through the touch member.

13. The apparatus of claim 1, realized as a micro-electro-mechanical system (MEMS) or nano-electro-mechanical system (NEMS) embedded in the image unit.

14. The apparatus of claim 1, wherein the size is a vertical size of the haptic.

15. The apparatus of claim 1, wherein the size is a physical size of the haptic.

16. The apparatus of claim 1, wherein the haptic numerically calculating unit divides the image to be displayed into a plurality of regions where each region including a respective designated number of voxels.

17. The apparatus of claim 1, wherein the haptic information of each region is calculated as a digital value.

18. A method of providing haptics of an image displayed through an image unit, comprising:
    calculating values for dividing the image to be displayed into a plurality of regions where each region includes a respective designated number of pixels, the respective designated number being determined in consideration of a resolution of haptics to be provided to a user and a size of a portion of the image to be touched by the user;
    calculating haptic information of each region where at least two of the plurality of regions have different sizes of haptics;
    checking whether a user touches a desired portion of an image divided in the image unit, and searching for a position of the portion based on the checking;
    selecting the calculated haptic information corresponding to the position searched by the touch unit; and
    changing magnetic forces according to the haptic information corresponding to the searched position and expressing the changed magnetic forces through the image unit,
    wherein in the changing of magnetic forces, the changing magnetic forces is using a magnetic force changing unit comprising a lower magnetic force unit, and an upper magnetic force unit that includes a fewer number of electromagnetic cells than the lower magnetic force unit and the fewer number of electromagnetic cells are movable to the touched position with respect to the lower magnetic force unit and the magnetic force changing unit is movable to change the magnetic forces, wherein haptics of the portion are provided to the user through the change of the expressed magnetic forces.

19. The method of claim 18, further comprising generating information on haptics of the image to be displayed as the haptic information.

20. The method of claim 19, wherein the generating of the information includes:

the dividing of the image to be displayed; and storing numerically calculated results of each region as the haptic information.

21. The method of claim 20, wherein the generating of the information further includes compressing duplicated parts in the numerically calculated results, and wherein the compressed results are stored as the haptic information.

22. The method of claim 18, wherein the searching for the position of the portion includes:

judging whether the portion of the image is touched; and searching for a position of the touched portion when it is judged that the portion of the image is touched.

23. The method of claim 18, performed in an image haptics providing apparatus having upper and lower magnetic force units, each of which is embedded in the image unit and has a plurality of electromagnetic cells, the method further comprising moving the upper magnetic force unit from a current position to the searched position before the changing of the magnetic forces.

24. The method of claim 18, wherein calculating of the values for dividing the image to be displayed into a plurality of regions where each region includes a respective designated number of voxels.

25. The method of claim 18, wherein the haptic information of each region is calculated as a digital value.

26. An image haptics providing apparatus, comprising:

a haptics numerically calculating unit dividing the image to be displayed into a plurality of regions where each region includes a respective designated number of pixels, the respective designated number being determined in consideration of a resolution of haptics to be provided to a user and a size of a portion of the image to be touched by the user, and calculating haptic information for each region, where at least two of the plurality of regions have different sizes of haptics;

a touch unit determining whether a user has touched a portion of the divided image displayed on an image unit and determining a position of the touched portion; and a magnetic force changing unit selecting calculated haptic information corresponding to a position searched among the calculated haptic information for each region and communicating magnetic forces changed in response to the selected haptic information through the image unit, wherein the magnetic force changing unit comprises:

a lower magnetic force unit, and an upper magnetic force unit that includes a fewer number of electromagnetic cells than the lower magnetic force unit and the fewer number of electromagnetic cells are is movable to the touched position with respect to the lower magnetic force unit to change the magnetic forces.

27. The apparatus of claim 26, comprising a haptic information generating unit which receives an image to be displayed, generates the haptic information, the haptic information corresponding to an input image, and outputs the generated haptic information to the magnetic force changing unit.

28. The apparatus of claim 26, wherein the magnetic force changing unit includes:

an upper magnetic force unit embedded in the image unit and including at least one electromagnetic cell changing its magnetic force in response to an upper magnetic force control signal;

a lower magnetic force unit embedded in the image unit under the upper magnetic force unit, and including a plurality of electromagnetic cells their changing magnetic forces in response to a lower magnetic force control signal; and a control signal generating unit searching for haptic information corresponding to the desired position, analyzing the located haptic information, generating the upper and lower magnetic force control signals using analyzed results.

29. The apparatus of claim 26, wherein the haptic numerically calculating unit divides the image to be displayed into a plurality of regions where each region including a respective designated number of voxels, and the haptic information for each region is calculated as a digital value.

30. An image unit comprising:

a display module for displaying an image;

a haptics numerically calculating unit dividing an image to be displayed into a plurality of regions where each region includes a respective designated number of pixels, the respective designated number being selectively determined in consideration of a resolution of haptics to be provided to a user and a size of a portion of the image to be touched by the user, and calculating haptic information of each region, where at least two of the plurality of regions have different sizes of haptics;

an upper magnetic force unit above the display module and including at least one electromagnetic cell changing magnetic forces in response to an upper magnetic force control signal;

a lower magnetic force unit under the upper magnetic force unit and including a plurality of electromagnetic cells changing magnetic forces in response to a lower magnetic force control signal;

a touch unit determining whether a user has touched a portion of the divided image and searching for a position of the touched portion; and a magnetic force changing unit selecting the calculated haptic information corresponding to the region including the position checked by the touch unit and generating the upper and lower magnetic force control signals using analyzed results to communicate the haptic information, wherein the upper magnetic force unit has a fewer number of electromagnetic cells than the lower magnetic force unit and is movable to the touched position with respect to the lower magnetic force unit to change the magnetic forces.

31. The image unit of claim 30, wherein the haptic numerically calculating unit divides the image to be displayed into a plurality of regions where each region including a respective designated number of voxels, and the haptic information of each region is calculated as a digital value.

32. An apparatus for providing haptics of an image displayed through an image unit, comprising:
- a touch unit checking whether a user has touched a portion of the displayed image, and searching for a position of the portion when the user touches the portion; and
- a magnetic force changing unit comprising a lower magnetic force unit, and an upper magnetic force unit that includes a fewer number of electromagnetic cells than the lower magnetic force unit and the fewer number of electromagnetic cells are movable to the touched position with respect to the lower magnetic force unit and changing magnetic forces in response to haptic information corresponding to the position and expressing the changed magnetic forces through the image unit, wherein the magnetic force changing unit selectively provides convex and concavo feedback to the user by generating a repulsive force or an attractive force, a size of the generated feedback being based on a position of the touched portion.

33. The apparatus of claim 32, wherein the magnetic force changing unit includes an upper magnetic force unit and a lower magnetic force unit, and the upper magnetic force unit is configured to move parallel to the lower magnetic force unit for changing the magnetic forces.

34. The apparatus of claim 32, wherein the selectively provided convex and concavo feedback is used to distinguish an icon from a non-icon in the image displayed through the image unit.

35. The apparatus of claim 32, wherein the selectively provided convex and concavo feedback is used to distinguish a first character from a second character in the image displayed through the image unit.

36. The apparatus of claim 33, wherein a sine waveform is supplied as upper and lower control signals to the upper magnetic force unit and the lower magnetic force unit to create a sensation of touching paper for the user.

* * * * *

UNITED STATES PATENT AND TRADEMARK OFFICE
CERTIFICATE OF CORRECTION

| | | |
|---|---|---|
| PATENT NO. | : 7,978,180 B2 | Page 1 of 1 |
| APPLICATION NO. | : 11/183171 | |
| DATED | : July 12, 2011 | |
| INVENTOR(S) | : Yoon-sang Kim et al. | |

It is certified that error appears in the above-identified patent and that said Letters Patent is hereby corrected as shown below:

Column 13, Line 65, In Claim 26, delete "are is" and insert -- are --, therefor.

Signed and Sealed this
Fourteenth Day of February, 2012

David J. Kappos
*Director of the United States Patent and Trademark Office*